(12) United States Patent
Den Hartog (10) Patent No.: US 9,204,482 B2
(45) Date of Patent: Dec. 1, 2015

(54) MODEM-ROUTER UNIT, ACCESS NODE, AND METHOD OF ENABLING COMMUNICATION WITH A PACKET SWITCHED NETWORK

(75) Inventor: Jos Den Hartog, SE Capelle a/d ljssel (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 525 days.

(21) Appl. No.: 13/634,202

(22) PCT Filed: Mar. 22, 2010

(86) PCT No.: PCT/EP2010/001782
§ 371 (c)(1),
(2), (4) Date: Oct. 8, 2012

(87) PCT Pub. No.: WO2011/116783
PCT Pub. Date: Sep. 29, 2011

(65) Prior Publication Data
US 2013/0182560 A1 Jul. 18, 2013

(51) Int. Cl.
*H04W 76/02* (2009.01)
*H04L 12/28* (2006.01)
(Continued)

(52) U.S. Cl.
CPC ........... *H04W 76/028* (2013.01); *H04L 12/287* (2013.01); *H04L 12/2898* (2013.01); *H04L 45/00* (2013.01); *H04L 2212/00* (2013.01); *H04W 40/24* (2013.01)

(58) Field of Classification Search
CPC ... H04W 76/028; H04W 40/00; H04W 40/24; H04W 24/08; H04L 45/00; H04L 12/2898; H04L 12/287; H04L 2209/601; H04L 12/4633

USPC .......... 370/216, 217, 221, 225, 241, 242, 248
See application file for complete search history.

(56) References Cited

U.S. PATENT DOCUMENTS 8,457,121 B1 * 6/2013 Sharma et al. ................ 370/389
2004/0033786 A1 * 2/2004 Kirkpatrick .................. 455/74.1
(Continued)

FOREIGN PATENT DOCUMENTS

EP 2043300 A1 4/2009
WO 2005039137 A1 4/2005

OTHER PUBLICATIONS

Fon, "Buy your Fonera 2.0N Fantastic and Exactly what a Router Should be Doing -Wired" Blog page, Mar. 9, 2010, pp. 1-2, [retrieved on Apr. 16, 2015] Retrieved from the internet: URL: http://web.archive.org/web/20100309093450/http://www.fon.com/en.
(Continued)

*Primary Examiner* — Obaidul Huq
(74) *Attorney, Agent, or Firm* — Coats & Bennett, PLLC (57) ABSTRACT

The present invention provides a primary modem-router for enabling communication between user equipment and a home network. The primary modem-router comprises an access communication unit for enabling a connection with said home network, and a wireless communication unit. The primary modem-router further comprises a line monitoring unit for monitoring connection quality of the connection with the network. The line monitoring unit provides a connection failure signal upon detection of insufficient connection quality. A processing unit of the primary modem-router is arranged for receiving the connection failure signal, and for establishing a wireless connection with a further modem-router unit upon receipt of this signal. This enables communication with the home network. The invention further provides an access node and method of enabling communication with a network.

14 Claims, 4 Drawing Sheets

(51) Int. Cl.
*H04L 12/701* (2013.01)
*H04W 40/24* (2009.01)

(56) References Cited

U.S. PATENT DOCUMENTS

2008/0056121 A1* 3/2008 Tsai et al. .................... 370/216
2010/0061244 A1* 3/2010 Meier et al. .................. 370/236

OTHER PUBLICATIONS

Wikipedia, "Digital subscriber line access multiplexer", On-line Encyclopedia, Apr. 30, 2009, pp. 1-3, [retrieved on Apr. 16, 2015] Retrieved from the internet: http://web.archive.org/web/20090430234816/http://en.wikipedia.org/wiki/Digital_subscriber_line_access_multiplexer.

Wikipedia. "Asymmetric digital subscriber line." On-line Encyclopedia, Feb. 27, 2010, pp. 1-4 [retrieved on Apr. 16, 2015] Retrieved from the internet: http://web.archive.org/web/20100302013338/http://en.wikipedia.org/wiki/Asymmetric_digital_subscriber_line.

Wikipedia. "DSL modem." On-line Encyclopedia, Feb. 6, 2010, pp. 1-3 [retrieved on Apr. 16, 2015] Retrieved from the internet: http://web.archive.org/web/20100216165234/http://en.wikipedia.org/wiki/DSL_modem.

Wikipedia. "Virtual private network." On-line Encyclopedia, Mar. 1, 2010, pp. 1-7 [retrieved on Apr. 16, 2015] Retrieved from the internet: http://web.archive.org/web/20100302115829/http://en.wikipedia.org/wiki/Virtual_private_network.

Slashdot. "Windows 7 Can Create Rogue Wi-Fi Access Point." Blog page, Feb. 19, 2010, pp. 1-19 [retrieved on Apr. 16, 2015] Retrieved from the internet: http://mobile.slashdot.org/story/10/02/19/2324257/Windows-7-Can-Create-Rogue-Wi-Fi-Access-Point?art_pos=3.

Wikipedia. "Ping." On-line Encyclopedia, Feb. 11, 2010, pp. 1-6 [retrieved on Apr. 16, 2015] Retrieved from the internet: http://web.archive.org/web/20100214000522/http://en.wikipedia.org/wiki/Ping.

Horman, S. "Linux Virtual Server Tutorial" Blog page, Mar. 2004, pp. 1-24 [retrieved on Apr. 16, 2015] Retrieved from the internet: http://web.archive.org/web/20100316194820/http://www.ultramonkey.org/papers/lvs_tutorial/html.

* cited by examiner

200
MODEM-ROUTER UNIT, ACCESS NODE, AND METHOD OF ENABLING COMMUNICATION WITH A PACKET SWITCHED NETWORK

TECHNICAL FIELD

The present invention is directed to a primary modem-router unit for enabling communication between user equipment and a packet switched home network, comprising an access communication unit and a wireless communication unit, wherein said access communication unit comprises a network connector unit for enabling an access connection between said primary modem-router unit and said home network, wherein said wireless communication unit is arranged for enabling wireless connections with said user equipment.

The present invention is further directed to an access node for use in a packet switched network for cooperating with a primary modem-router unit as mentioned above.

Moreover, the present invention is directed to a method of enabling communication between user equipment and a packet switched home network using a primary modem-router unit as mentioned above.

BACKGROUND

Users of a packet switched network are commonly connected to the network by means of modem-router units. A modem-router unit is commonly in between the user equipment (such as telephones, personal computers, facsimile machines, televisions, etcetera) and the actual network entities of the packet switched network. The modem-router unit often comprises a modem for conversion of communication signals from the external to the internal network, a router for internally delivering data traffic to the correct user equipment, a firewall for protection of the internal network behind the modem-router unit from the external network, a switch or hub for use by the internal network, and various other optional logical or physical entities.

For actual communication with the network and the user equipment, the modem-router comprises a communication unit, often comprising a wireline communication unit and a wireless communication unit. The wireline communication unit handles all wireline communication, amongst others the communication between the modem-router unit and the packet switched external network, but also wireline connections between the modem-router unit and computers and other entities on the internal network. The wireless communication unit or wireless access point enables user equipment and entities of the internal network to set up a wireless connection with the modem-router unit. This enables, for example, users to connect to the modem-router unit and to the external packet switched network with a laptop and a wireless local area network (WLAN, according to standard IEEE 802.11) connection.

From time to time, and for many different reasons, a physical connection between the modem-router unit and the external packet switched network entities may fail, or may be insufficient for enabling proper communication. As a result of the failing data connection, the entities present on the internal network that rely on communication with the packet switched external network will not be available to the user. For example, the user will not be able to make a telephone call with his voice-over IP phone, a website or other public services of the user running on a server on the internal network will not be available, web related services on the television of the user may be available, and many other internet services such as e-mail or server will not be available to the user.

SUMMARY

It is an object of the present invention to obviate at least some of the abovementioned disadvantages of the prior art, and enable some form of communication upon failing of a physical connection between a modem-router unit and an external network.

This and other objects are achieved by the present invention in that there is provided a primary modem-router unit for enabling communication between user equipment and a packet switched home network. The primary modem-router unit comprises an access communication unit and a wireless communication unit. The access communication unit comprises a network connector unit for enabling a physical connection between said primary modem-router unit and said home network. The wireless communication unit is arranged for enabling wireless connections with said user equipment. The primary modem-router unit further comprises a line monitoring unit for monitoring, in use, a connection quality status of said established access connection through said network connector unit. The line monitoring unit is arranged for indicating, dependent on the connection quality status, a connection failure signal upon detection of insufficient quality of said access connection. The primary modem-router unit further comprises a processing unit for controlling the communication. The processing unit is arranged for cooperating with the line monitoring unit for receiving signals from the line monitoring unit. The processing unit is arranged for establishing a wireless connection through the wireless communication unit with a further modem-router unit upon receipt of the connection failure signal from the line monitoring unit. This enables communication with the packet switched home network through the further modem-router unit.

The primary modem-router unit of the invention takes advantage of the fact that in many cases (except in rural areas having a very dispersed and limited number of inhabitants) near the primary modem-router unit, various other wireless networks can be detected/received having a relatively good quality for enabling wireless communications therewith. The primary modem-router unit of the present invention enables use of these other networks when the primary connection (the physical connection) between the primary modem-router unit and the home network fails. The primary modem-router unit of the present invention initiates the setting-up of a wireless connection dependent on whether or not the communication through said physical connection is still possible. As will be appreciated by the skilled person, the further modem-router unit of the neighbour that facilitates the temporary connection must be programmed to recognise the primary modem-router unit, and to allow the primary modem-router unit to connect with the packet switched network through the further modem-router unit. This will be a simple setting in the further modem-router unit which can be agreed upon by neighbours.

Using the primary modem-router unit of the present invention, the user will be able to perform a number of functions through his primary modem-router unit for which the availability of the packet switched home network is required. This may also enable the possibility to raise an alarm on the failing connection with the internet service provider that controls his packet switched home network.

In the present document, by monitoring the connection quality status it is meant that the quality of the access connection is monitored. Insufficient quality, in this connection, should be understood to mean that the quality of the connection is not sufficient to provide a reasonable level of service to the user. This of course is dependent on what a user considers to be a reasonable level of service. To be clear, insufficient quality can also be interpreted as meaning that the bandwidth is effectively limited by e.g. a bit error rate above a threshold level, packet loss, etc. or no communication in at least one direction. The threshold levels to determine this may be pre-configurable by either the user or the manufacturer, or the internet service provider.

According to a further embodiment, the processing unit is arranged for enabling the communication by sending and receiving data packets. In particular, the processing unit is arranged for encapsulating the data packets in a tunneling data protocol for sending them through said further modem-router unit. The processing unit is further arranged for retrieving received data packets from the tunneling data protocol during communication with the home network through said further modem-router unit.

By encapsulating the data packets in a tunneling data protocol, and by being able to retrieve the original data packets from the tunneling protocol by means of 'decapsulating', the primary modem-router unit according to this embodiment of the invention is able to set up a data communication tunnel through the further modem-router unit with the home network. Data communication protocols are common in applications such as virtual private network (VPN). A data communication tunnel enables communication through network entities in a transparent manner, as if the network entities conveying the tunnel are not present in the connection. Data communication tunnels are often used for enabling communication through unreliable or unsafe network entities.

In the present case, the setting up of a data communication tunnel enables the primary modem-router unit to set up a connection with the home network providing full functionality to the user equipment on the internal network. The user equipment, such as a file server, a voice-over IP telephone, may not even notice that the physical connection between the modem-router unit is failing, amongst other because it is even possible to set up the tunnel such that the public internet protocol address of the primary modem-router remains unchanged. The skilled person will appreciate that the setting up of a data communication tunnel through the further modem-router unit must be allowed by the further modem-router unit. This requires correct settings to be programmed in the further modem-router unit.

According to a further embodiment of the present invention, the primary modem-router unit further comprises a memory unit for storing indirect connectivity data. This enables the setting-up of connections through the further modem-router unit.

With indirect connectivity data it is meant that the data is in particular used while a connection between the primary modem-router unit and the home network is set up through a wireless connection with the further modem-router unit; i.e. a back-up or indirect connection. Indirect connectivity data may be preprogrammed by the manufacturer or an internet service provider, retrieved from a remote location on the packet switched network, or programmed by the user. The indirect connectivity data may also be programmed from a remote location (e.g. on initiative of a new service provider in case the user changes from internet service provider).

In particular, the indirect connectivity data may comprise at least one of the following. The indirect connectivity data may comprise forwarding rules for exclusively reserving communication ports of the further modem-router unit for use either primary modem-router unit. By enabling the primary modem-router unit to send port forwarding rules to the further modem-router unit, the primary modem-router unit (dependent on the setting of the further modem-router unit) is able to establish a connection to the home network via the further modem-router unit of which the level of functionality can be determined by the user. Port forwarding rules enable the user to define which ports will be operable at the primary modem-router unit by forwarding traffic to these ports from the further modem-router unit.

The indirect connectivity data may comprise node connectivity data for enabling the modem-router unit to connect to an access node on the home network during the communication with the home network through the further modem-router unit. Node connectivity data is related to a specific node on the packet switched network, e.g. an access node. The term indirect connectivity data used herein above and below is meant more generally to be directed to data for specific or maybe even exclusive use during an indirect connection as mentioned above. By making available node connectivity data to the primary modem-router unit, the primary modem-router unit may immediately after establishing the communication with the home network via the wireless connection through the further modem-router unit connect the access node for exchanging information and receiving communication services. For example, the primary modem-router unit may raise an alarm regarding a failing physical connection, and the access node may be especially programmed to deliver services to the primary modem-router unit via the established bypass route through the further modem-router unit.

The indirect connectivity data may also comprise authentication data for enabling authentication of the primary modem-router unit by a network entity of the home network, during the communication with the home network through the further modem-router unit. It will be appreciated that when the physical connection between the primary modem-router unit and the home network fails, and the primary modem-router unit has to rely on a bypass by the further modem-router unit, authentication of the traffic coming from the primary modem-router unit through the further modem-router unit is necessary in the home network because the communication the primary modem-router unit is conveyed via an unexpected route. Identification of the primary modem-router unit by the home network by means of the physical connection (one form of authentication that is normally used in combination with other forms of authentication) is in that case no longer possible. An additional means of authentication is therefore advisable.

According to a further embodiment the processing unit is arranged for retrieving an updated public internet protocol address for use by the primary modem-router unit on the network during communication through the further modem-router unit. The processing unit retrieves the updated public internet protocol address upon establishing the wireless connection with the further modem-router unit.

In order to enable receipt of data traffic by the user equipment on the internal network, a proper public internet protocol address needs to be communicated by the user equipment on the packet switched network to other entities communicating with the user equipment entities. This public internet protocol address will normally not change when the primary modem-router unit is connected to the home network via the physical connection. However, as soon as a bypass connection is to be made by the primary modem-router unit with the home network, sending the data to the normal public internet protocol address will fail because this address is assigned to the physical connection of the primary modem-router unit. Instead, the primary modem-router unit may either communicate the public internet protocol address of the end point of the data communication tunnel (i.e. in the access node), or a different public internet protocol address, such as the public internet protocol address of the further modem-router unit. The latter may for example form a solution in case use is made of port forwarding by the further modem-router unit on request of the primary modem-router unit.

According to a further embodiment of the present invention, the monitoring unit is arranged for providing a connection restore signal upon detecting restoration of sufficient quality of the monitored access connection. The processing unit may in that case be arranged for discontinuing the wireless connection with the further modem-router unit upon receipt of the connection restore signal. It will be appreciated that as soon as the physical connection is operable again, it is no longer necessary to maintain the bypass.

According to a further embodiment the primary modem-router unit is arranged for receiving an inbound connection request through the wireless communication unit from an external modem-router unit. In this embodiment, the primary modem-router unit is further arranged for relaying communication signals associated with the external modem-router unit for establishing a further access connection between the external modem-router unit and an external packet switched network associated with the external modem-router unit. In this embodiment, in addition to being able to set up a bypass connection in case its own physical connection fails, the primary modem-router unit is also arranged for allowing an external modem-router unit to set up a bypass connection via the primary modem-router unit through its active connection with the packet switched network. In case, for example, two users living next door of each other both use a primary modem-router unit in accordance with the present invention, these primary modem-router units are able to set up a bypass connection via each others physical connection in case their own physical connection fails.

According to a further embodiment of the present invention, the primary modem-router unit is arranged for allowing the establishment of a data communication tunnel from the external modem-router unit to the external packet switched network through said primary modem-router unit. This allows the setting up of a communication tunnel by the external router through the primary modem-router unit, providing the benefit of such a data communication tunnel to the external modem-router unit as described above.

According to a second aspect of the present invention, there is provided an access node for use in a packet switched network for cooperating with a primary modem-router unit as described above. The access node comprises a communication unit. The communication unit is arranged for enabling communication through the network by sending and receiving data packets. The communication unit is further arranged for encapsulating the data packets in a tunneling data protocol for sending the data packets to a primary modem-router unit using a data communication tunnel through a further modem-router unit. Moreover, the communication unit is arranged for retrieving from the tunneling data protocol, data packets received the primary modem-router unit.

The access node according to this second aspect of the present invention enables the setting up of a full functional data communication between the access node and the primary modem-router unit in case failure of a physical connection of the primary modem-router unit. Data communication tunnels enable communication through various network entities without these entities being able to retrieve the payload of the data packets. This enables a secure means of data communication through unreliable network entities, or network entities that may be insecure. Data communication tunnels are for example applied in virtual private networks (VPN). The access node of this second aspect of the invention forms a gateway between the data communication tunnel (the tunnel end point) and the packet switched home network associated with the primary modem-router unit.

According to an embodiment of the access node of the second aspect, the access node is arranged for providing an alarm signal to a further network entity in the packet switched network. Such an alarm signal should be provided upon establishing the data communication tunnel for indicating failure of the communication between the network and the primary modem-router unit through a physical connection of the primary modem-router unit. By setting up of the data communication tunnel, the home network automatically knows that there is a communication problem on the physical connection. Of course, the cause of the communication problem may be on the side of the user (e.g. physical connection being physically disconnected) or may be on the side of the internet service provider/home network (e.g. technical problem in the network). The raising an alarm, the problem can be investigated by the internet service provider.

According to a further embodiment, the access node of the second aspect of the invention is arranged for providing an updated public internet protocol address for the primary modem-router unit on the network, for use during the communication with the network through the further modem-router unit. Upon establishing of a tunnel, the access node may for example communicate the public internet protocol address of the end point of the tunnel in the access node back to the primary modem-router unit for distribution amongst the user equipment.

In a particular embodiment, the communication unit of the access node is arranged for assigning a virtual internet protocol address to a digital subscriber line access multiplexer (DSLAM) associated with a physical connection between the primary modem-router unit and the network. In this embodiment, the communication unit is further arranged for assigning the same virtual internet protocol address to the end point of a data communication tunnel within the access node itself for use with this data communication tunnel, where such a data communication tunnel is established via a bypass route. The need to update and re-communicate the updated internet protocol address is obviated by this embodiment of the present invention. As will be appreciated by the skilled person this will be a more elegant solution, since this is transparent to the user equipment connected to the primary modem-router unit (and the primary modem-router unit itself).

According to a third aspect of the present invention, there is provided a method of enabling communication between user equipment and a packet switched home network using a primary modem-router unit. The primary modem-router unit comprises a processing unit for controlling the communication. It further comprises an access communication unit and a wireless communication unit. The wireless communication unit is arranged for enabling wireless connection with the user equipment. The access communication unit comprises a network connector unit for enabling a physical connection between the primary modem-router unit and the home network.

The method according to the third aspect comprises the steps of:
    a line monitoring unit of said primary modem-router unit performing a step of monitoring in use a connection quality status of an established access connection through said network connector unit;

said line monitoring unit, dependent on said connection quality status, indicating a connection failure signal upon detection of insufficient quality of said access connection;

said processing unit cooperating with said line monitoring unit for receiving signals from said line monitoring unit; and said processing unit establishing a wireless connection through said wireless communication unit with a further modem-router unit upon receipt of said connection failure signal from said line monitoring unit, for enabling communication with said packet switched home network through said further modem-router unit.

BRIEF DESCRIPTION OF THE DRAWINGS

The present invention will further be elucidated by means of some specific and illustrative embodiments thereof, which are described here for the purpose of clarification of the invention to the skilled reader. These embodiments are not intended to limit the scope of the invention. The scope of the invention is defined in the claims of the application. The description of the embodiments is supported by illustrations in the appended figures, wherein:

DETAILED DESCRIPTION

Figure 1:
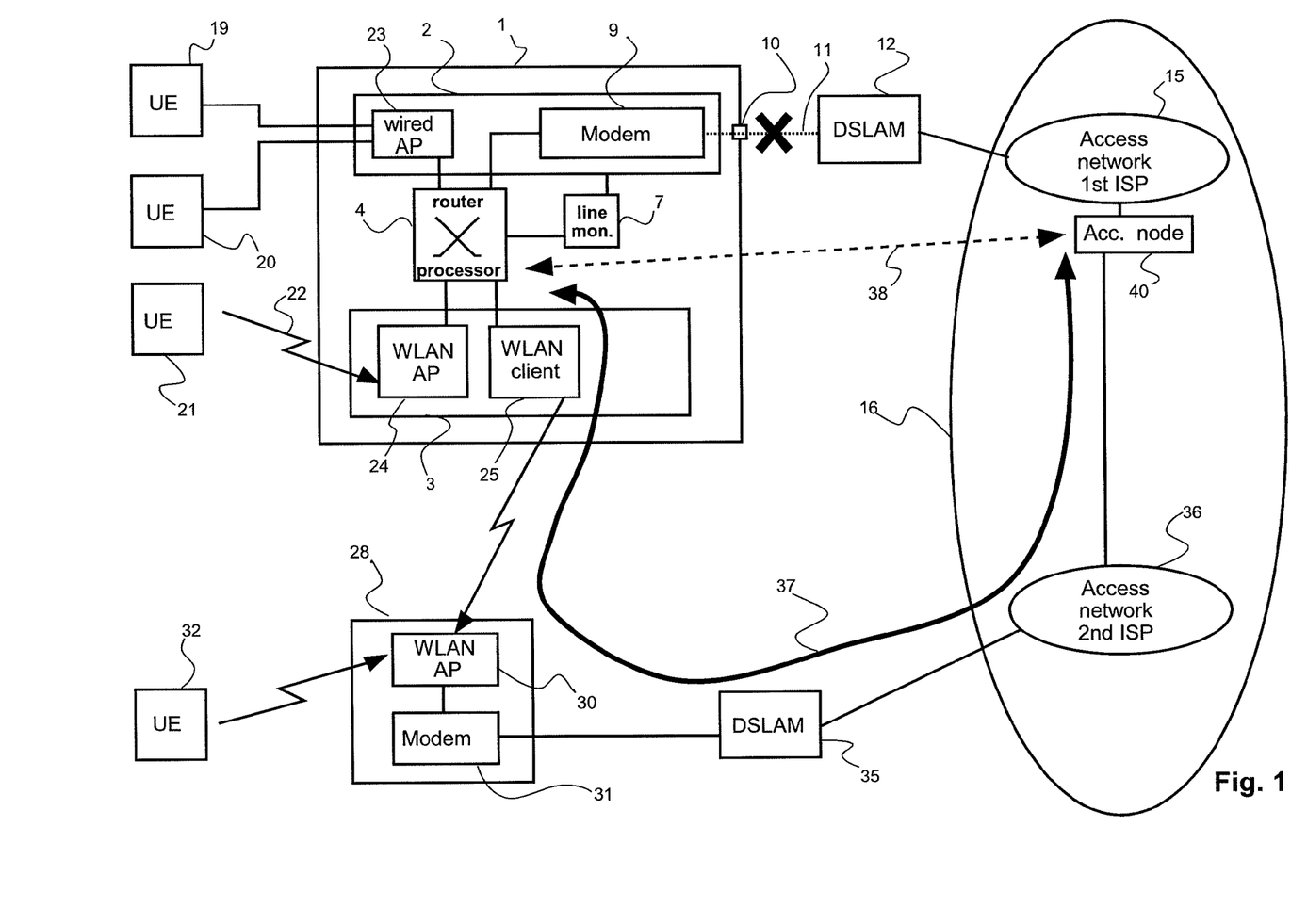
FIG. 1 illustrates a first embodiment of the present invention.

In FIG. 1, a primary modem-router unit is illustrated. This primary modem-router unit may for example be an ADSL modem-router ("asynchronous digital subscriber line" (ADSL)). The modem-router unit 1 comprises an access communication unit 2 and a wireless communication unit 3. The wireless communication unit 3 comprises a wireless local area network access point (WLAN AP) to which WLAN clients such as WLAN client 21, may be connected via a wireless connection 22. The access communication unit 2 comprises an access point 23 to which network entities of the internal network of the user (user equipment), such as entities 19 and 20, may be connected through a physical connection.

The heart of the modem-router unit is the router, which is considered to be the processing unit 4 in accordance with the present invention. The router unit 4 controls the data communication on and in between the internal and external networks as far as it is associated with modem-router unit 1. For connecting to the internet 16, the primary modem-router unit 1 comprises, as part of its access communication unit 2, a modem 9 which takes care of handling the data traffic from router 4 and providing the required communication signals for communication over the asynchronous digital subscriber line (ADSL) connection 11. The access communication unit 2 further comprises a network connector port 10 to which the external network is physically connected by means of connection 11.

On the external network, a digital subscriber line access multiplexer (DSLAM) 12 receives the physical connection 11 from the modem-router unit and is connected to the access network 15 of the internet service provider (ISP) of the user: the first ISP (1$^{st}$ ISP). Under normal conditions the router 4 communicates with the internet 16 through the modem 9, the network connector port 10 and the physical connector, the DSLAM 12 to the access network 15 and on to the internet 16.

In the situation in FIG. 1, the physical connection 11 fails to be operational and no communication between the modem 9 and the DSLAM 12 is possible. In accordance with the present invention, the line monitoring unit 7 detects the failing physical connection 11 by monitoring network connector unit 10. The line monitoring unit 7 raises a connection failure signal which is received by the router 4. Upon receiving the connection failure signal from line monitoring unit 7, the router 4 opens a wireless local area network client (WLAN client) 25 on the wireless communication unit 3 and sets up a wireless connection with the WLAN AP 30 of modem-router unit 28 which is present in a location nearby the primary modem-router unit 1 (for example the modem-router unit 28 of a neighbour). The WLAN AP 30 receives the wireless connector, recognises the WLAN client 25 as being the modem-router unit 1 requesting a bypass connection, and allows the modem-router unit 1 to use the connection available by the modem-router unit 28. As will be appreciated, modem-router unit 28 is a regular modem-router unit to which local WLAN clients such as WLAN clients 32 may be connected as well. The modem-router unit 28 enables the modem-router unit 1 to make use of its connection with the internet 16 via the modem 31 of modem-router unit 28, the digital subscriber line access multiplexer 35 of the second ISP (the ISP of the neighbour), and the access network 36 of the second ISP.

As soon as the connection with the access network 36 is established the router 4 sets up a communication data tunnel through the established connection to an access node 40 of the first ISP. This is performance by the router encapsulating the data packets to be sent through the modem-router unit 28 in a tunneling data protocol, and sending these encapsulated data packets to the access node 40. The access node 40 is able to retrieve the original data packets from the encapsulated data packets by removing the tunneling data protocol. The access node 40 accepts the setting up of a data communication tunnel and the virtual bypass via the modem-router unit 28 and the access network of the second ISP between the primary modem-router unit 1 and the access network 15 of the first ISP is established through the access node 40. In FIG. 1, the connection path is indicated by arrow 37. The established data communication tunnel is indicated as dotted arrow 38. The data communication tunnel is experienced by the user of the primary modem-router unit 1 as a direct connection between the router 4 and the access node 40. In fact, the data communication tunnel 38 follows the communication path 37 through the network.

In FIG. 1, communication from the internet to the modem-router unit 1 can be established by addressing the IP address of the DSLAM 12 to which modem-router unit 1 is connected. However, in case the physical connection 11 fails and a bypass is set up by modem-router unit 1 through the further modem-router 28 to the access node 40, traffic to and from modem-router unit should be addressed to access node 40. From access node 40 the data is conveyed via data communication tunnel 38 to modem-router unit 1. It is therefore necessary to communicate the public internet protocol number of access node 40 back modem-router unit 1, for communication to the entities 19, 20 and 21 on the internal network. Traffic from the Internet 16 can then be addressed to the Internet protocol address of access node 40 for reaching its destination.

Alternatively, it is also possible to use virtual Internet protocol addresses ("Virtual IP addresses") for routing the traffic to primary modem-router unit 1 correctly through the network. In that case, primary modem-router unit 1 continues to use its regular public internet protocol number. In access node 40, a virtual Internet protocol address is assigned to DSLAM 12 in case the regular physical connection 11 is up and running, while as soon as a data communication tunnel is established, the access node 40 assigns this traffic to the end point of the data communication tunnel, i.e. within the access node itself, for reaching its destination via the established data communication tunnel taking path 37 through the further modem-router unit 28. For the user equipment 19, 20 and 21 behind the primary modem-router unit, the setting up of a data communication tunnel is in this situation completely transparent, whilst in the former situation, a new public internet protocol address is to be used by the user equipment 19, 20 and 21 for communication with the internet 16. As will appreciated, transparent solutions are more elegant from a technical point of view than non-transparent solutions.

Figure 2:
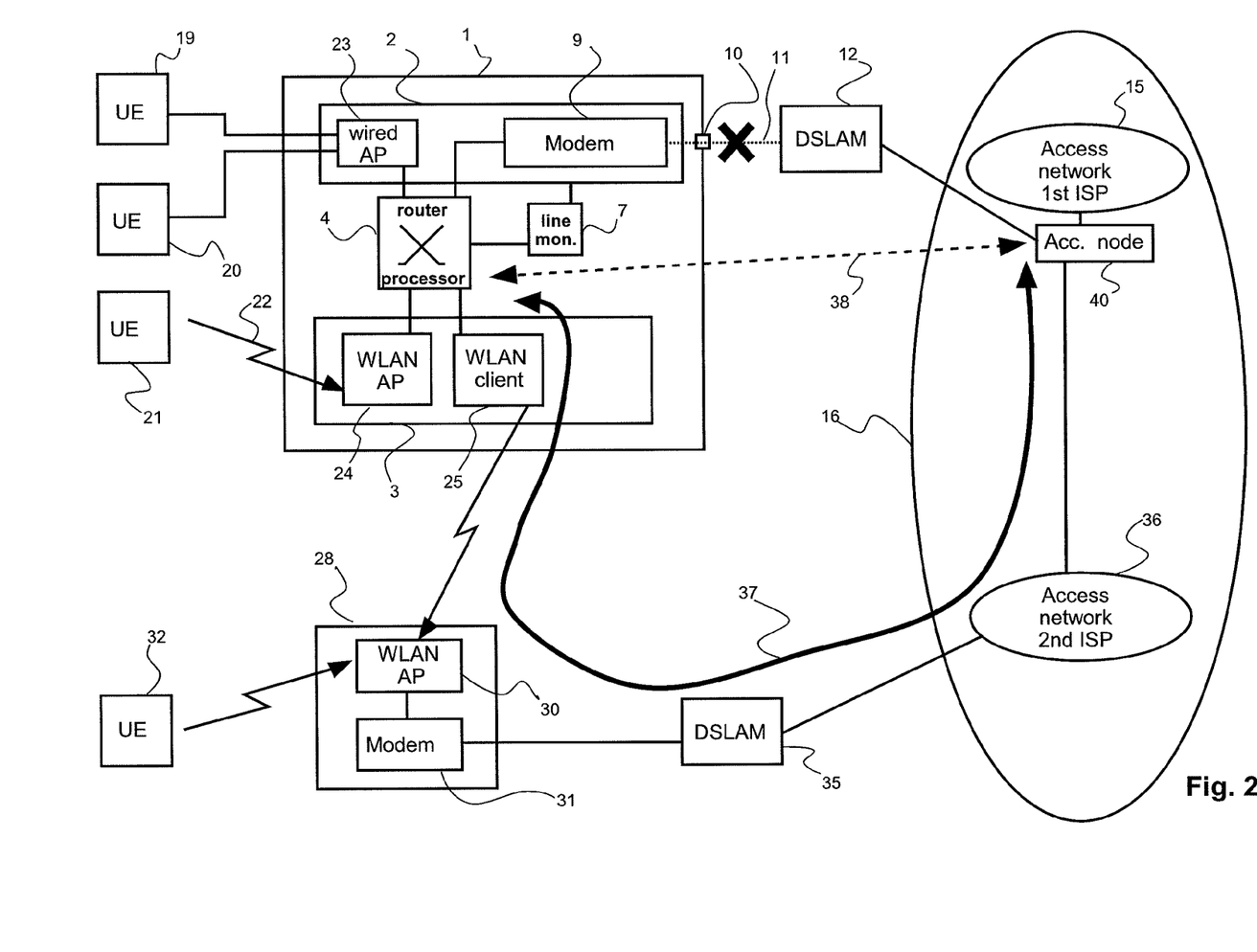
FIG. 2 illustrates a second embodiment of the present invention.

In FIG. 2, the above-mentioned situation with virtual IP address is schematically illustrated. All elements in FIG. 2 having a same or similar function as the corresponding elements in FIG. 1, have a same reference number. In fact, the main difference between FIGS. 1 and 2 is the direct connection between the access node 40 and the DSLAM 12. This enables the use of virtual IP addresses assigned by the access node 40. In this case, all traffic which is destined for primary modem-router unit 1 is routed by the access node 40 by assigning the virtual IP address either to DSLAM 12 when no data communication tunnel is established, or to the end point of the data communication tunnel 38 when this tunnel is established in view of a non-operable or poor quality connection 11.

Figure 3:
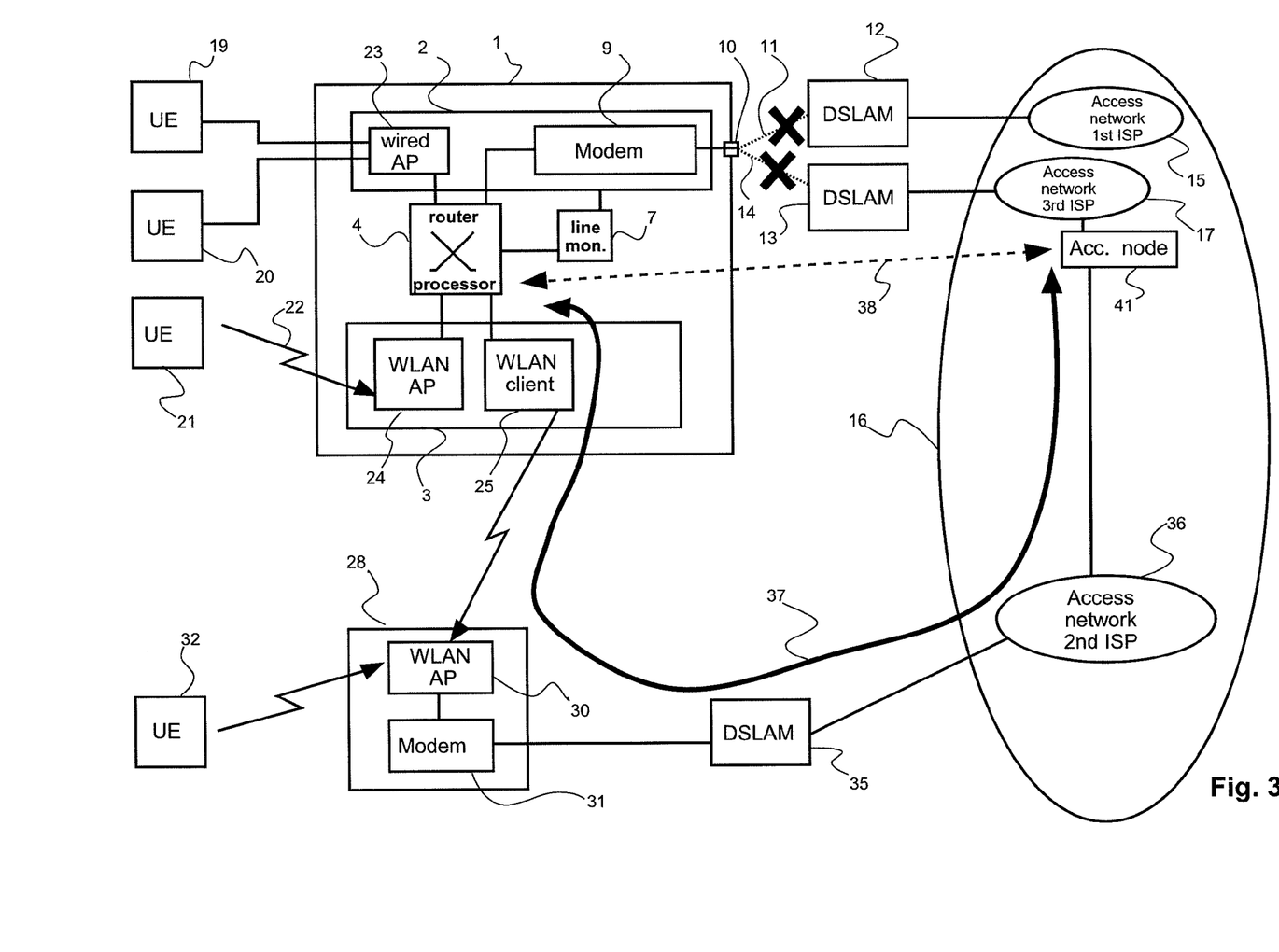
FIG. 3 illustrates a third embodiment of the present invention.

In FIG. 3, a further typical situation is illustrated in which the solution of the present invention can be implemented. In FIG. 3, all elements of FIG. 3 that have the same or a similar function as the elements in FIG. 1, are indicated by the same reference numbers.

In FIG. 3, the primary modem-router unit 1 used to be connected to the internet 16 by means of a first internet service provider with access network 15. Therefore, primary modem-router unit used to have a physical connection between DSLAM 12 and its network connect unit 10. However, the owner of primary modem-router unit 1 has decided to terminate the agreement with the first internet service provider, and switches to a new, third internet service provider. Often the switching from one internet service provider to another internet service provider may go smoothly. In the present example, the switching goes not so smoothly, and for whatever technical or administrative reason, the new access 14 connection with the third internet service provider cannot yet be established upon termination of the connection between primary modem-router unit 1 and the access network 15 of the first internet provider. Therefore, temporarily a physical connection such as connection 11 or 14, will be unavailable for a period of time (e.g. hours, days, weeks, or worse).

Using the primary modem-router unit 1 according to the present invention, a data communication tunnel 38 can be established via the path 37 through the wireless local area network client 25 of primary modem-router unit 1, the further modem-router unit 28 of the neighbour, the DSLAM 35 of the second internet service provider to which further modem-router unit 28 is connected, the access network 36 of the second internet service provider to access node 41 of the third internet service provider. This enables the primary modem-router unit to connect to the access network 17 of the third internet service provider, and onto the internet 16.

It will be appreciated by the person skilled in the art that the further modem-router unit 28 needs to accept a connection from wireless local area network client 25 in order to enable primary modem-router unit 1 to set up the connection with the access node 41. Another setting that may be required is the further modem-router unit to accept the setting up of data communication tunnels, e.g. such as is done for virtual private network data communication tunnels ("VPN tunnels"). These settings may be performed manual by the owner of the further modem-router unit 28 (e.g. owned by the neighbour).

Alternatively, since in many cases a modem-router unit is made provided by the internet service provider that delivers the service, the correct settings may be preset by the Internet service provider (this is not to be interpreted in a limited way, as one may understand that in some cases other parties may be enabled to preset these settings). The internet service provider may for example enable each of its modem-router units to accept incoming connection requests from WLAN clients having certain authentication details that are also preprogrammed. This guarantees that bypass connections can be established by the primary modem-router unit of the user through other modem-router units owned by other users, e.g. neighbours of that user, which are subscribed to the same Internet service provider as the user, in case for whatever reason the regular access connection cannot be used). No individual arrangements between users need to be made in that case.

Moreover, individual users, e.g. neighbours, may for example agree on bandwidth limits for enabling the connection. In that case, primary modem-router unit 1 would be assigned a maximum amount of bandwidth by further modem-router unit 28 for making the connection with the access node, and the user of further modem-router unit will not or hardly notice the use of its connection by the primary modem-router unit.

Figure 4:
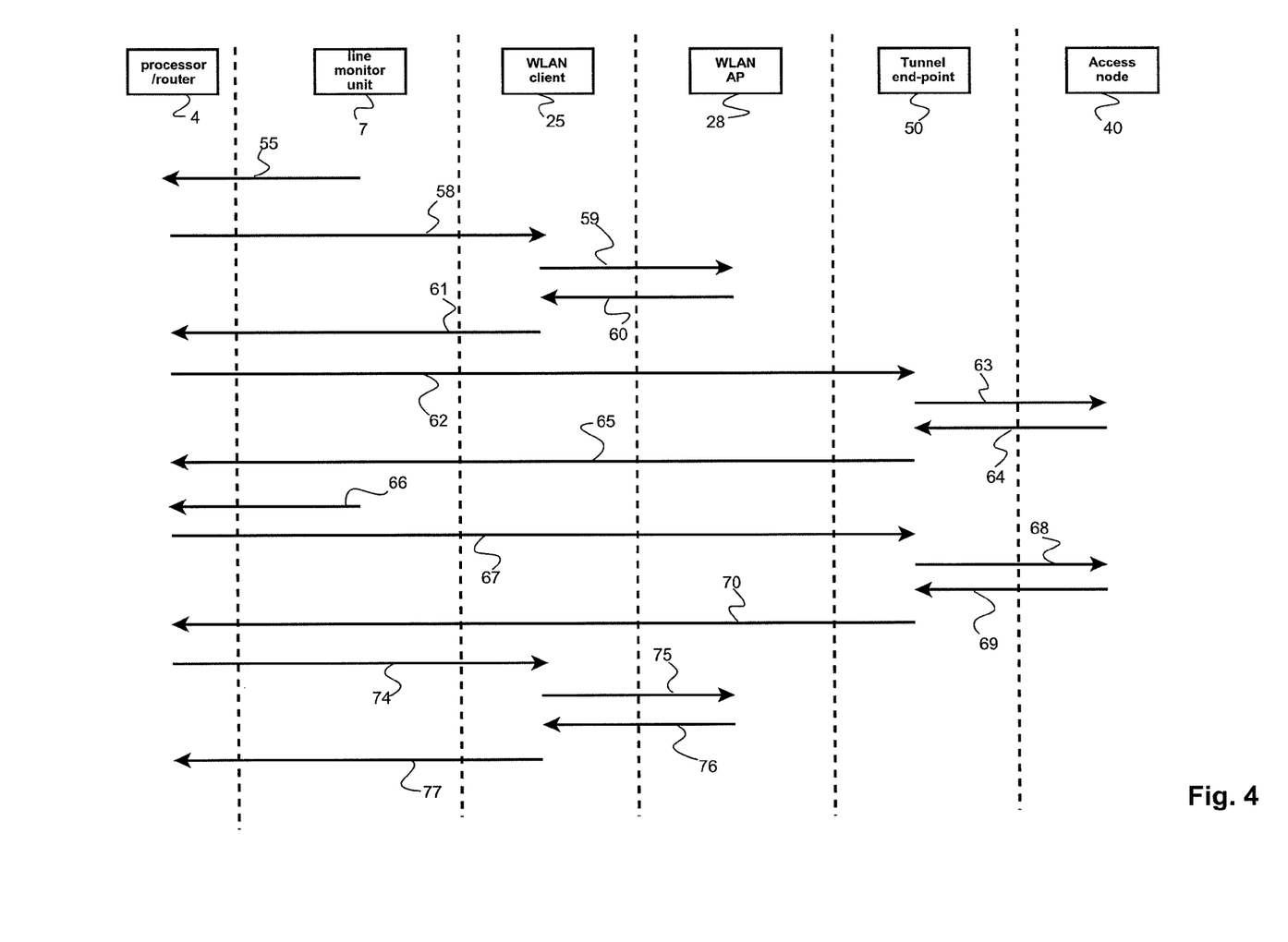
FIG. 4 illustrates a signalling diagram illustrating the method steps of the present invention.

The method of the present invention is illustrated in a signalling diagram in FIG. 4. At the top of FIG. 4 the various units taking part in the method of the present invention are schematically indicated. These include the router 4 of the primary modem-router unit 1, the line monitoring unit 7, the wireless local area network client 25 ("WLAN client"), the further modem-router unit 28, the end point 50 of the data communication tunnel 38 (this end point is not shown in FIGS. 1-3), and the access node 40.

The method of the present invention starts by line monitoring unit 7 detecting the unavailability of the physical connection 11 in step 55. In step 58, router 4 requests from WLAN client 25 the establishment of a wireless connection with further modem-router unit 28. In step 59, this request is forwarded by WLAN client 25 to further modem-router unit 28.

In step 60, further modem-router unit 28 accepts the wireless connection and communicates this back to the WLAN client 25. In step 61, the establishment of a wireless connection between the primary modem-router unit and the further modem-router unit is confirmed by the WLAN client 25 to the router 4.

Following the receipt of this confirmation, router 4, in step 62, requests the setting up of a data communication tunnel to a tunnel end point 50 in access node 40. This request is processed within access node 40 in steps 63 and 64, and confirmed from the tunnel end point 50 to the router 4 in step 65.

After step 65, data communication via the data communication tunnel 38 established in steps 62-65 is possible for all entities 19, 20 and 21 connected to primary modem-router unit 1. This regular operation of the data communication tunnel is not illustrated in FIG. 4.

As soon as the physical connection 11 is available again, this is detected by line monitoring unit 7 and communicated to the router 4. Router 4 in step 67, requests to close down the data communication tunnel 38 between router 4 and access node 40. From the tunnel end point 50, this request is forwarded within the access node 40 and the data communication tunnel is closed. This is confirmed back to the tunnel end point 50 in step 69, and back to the router 4 in step 70.

After receipt of this communication, router 4 terminates the wireless connection between the primary modem-router unit 1 and the further modem-router unit 28. This is done by sending a termination request in step 74 to the WLAN client 25 by the router 4. The WLAN client 25 forwards the termination request in step 75 to further modem-router unit 28. In return, in step 76, the wireless connection is terminated and this is confirmed to the WLAN client 25. This confirmation is forwarded in step 77 to router unit 4. Normal internet traffic via the physical connection 11 may continue.

In the foregoing, the invention has been described based on specific, non-limitative embodiments thereof. Various units and entities described in these specific embodiment may be implemented as hardware unit, or may be implemented as logical units or software units, as a skilled person will appreciate. In addition, the operation principal of the present invention can be implemented in many different ways and can be adapted for different purposes. Details and specific design choice can be made by the skilled person without departing from the inventive concept described herein. The scope of the present invention is only limited by the appended claims.

The invention claimed is:

1. A primary modem-router for enabling communication between user equipment and a packet switched home network, the primary modem-router comprising:
   access communication hardware comprising a network connector configured to enable an access connection between the primary modem-router and the home network;
   wireless communication hardware configured to enable wireless connections with the user equipment;
   line monitoring hardware configured to:
      monitor an in-use connection quality status of the access connection through the network connector;
      cause generation of, dependent on a connection quality status, a connection failure signal upon detection of insufficient quality of the access connection;
   processing hardware for controlling the communication, the processing hardware configured to:
      receive signals from the line monitoring hardware;
      establishing, in response to receipt of the connection failure signal from the line monitoring hardware, a wireless connection through the wireless communication hardware with a further modem-router for enabling a communication with the home network through the further modem-router;
      upon establishing the wireless connection with the further modem-router, retrieve an updated public internet protocol address for the primary modem-router on the home network for use during the communication with the home network through the further modem-router.

2. The primary modem-router of claim 1, wherein the processing hardware is configured to:
   enable the communication with the home network through the further modem-router by sending and receiving data packets;
   encapsulate the data packets in a tunneling data protocol for sending through the further modem-router;
   retrieve received data packets from the tunneling data protocol during the communication with the home network through the further modem-router.

3. The primary modem-router of claim 1, further comprising a memory configured to store indirect connectivity data for enabling setting-up connections through the further modem-router.

4. The primary modem-router of claim 1, wherein the indirect connectivity data comprises at least one element of a group comprising:
   port forwarding rules for exclusively reserving communication ports of the further modem-router for use by the primary modem-router;
   node connectivity data for enabling the modem-router to connect to an access node on the home network during the communication with the home network through the further modem-router;
   authentication data for enabling authentication of the primary modem-router by a network entity of the home network during the communication with the home network through the further modem-router.

5. The primary modem-router of claim 1:
   wherein the line monitoring hardware is configured to provide a connection restore signal upon detecting restoration of sufficient quality of the monitored access connection;
   wherein the processing hardware is configured to discontinue the wireless connection with the further modem-router upon receipt of the connection restore signal.

6. A primary modem-router for enabling communication between user equipment and a packet switched home network, the primary modem-router comprising:
   access communication hardware comprising a network connector configured to enable an access connection between the primary modem-router and the home network;
   wireless communication hardware configured to enable wireless connections with the user equipment;
   line monitoring hardware configured to:
      monitor an in-use connection quality status of the access connection through the network connector;
      cause generation of, dependent on a connection quality status, a connection failure signal upon detection of insufficient quality of the access connection;
   processing hardware for controlling the communication, the processing hardware configured to:
      receive signals from the line monitoring hardware;
      establish a wireless connection through the wireless communication hardware, with a further modem-router for enabling a communication with the home network through the further modem-router, in response to receipt of the connection failure signal from the line monitoring hardware;
      receive an inbound connection request through the wireless communication hardware from an external modem-router;
      relay communication signals associated with the external modem-router for establishing a further access connection between the external modem-router and a further packet switched network associated with the external modem-router.

7. The primary modem-router of claim 6, wherein the processing hardware is configured to, upon establishing the wireless connection with the further modem-router, retrieve an updated public internet protocol address for the primary modem-router on the home network for use during the communication with the home network through the further modem-router.

8. The primary modem-router of claim 6, wherein the primary modem-router is configured to allow the establishment of a data communication tunnel from the external modem-router to the further packet switched network through the primary modem-router.

9. The primary modem-router of claim 6, wherein the processing hardware is configured to:
enable the communication with the home network through the further modem-router by sending and receiving data packets;
encapsulate the data packets in a tunneling data protocol for sending through the further modem-router;
retrieve received data packets from the tunneling data protocol during the communication with the home network through the further modem-router.

10. The primary modem-router of claim 6, further comprising a memory configured to store indirect connectivity data for enabling setting-up connections through the further modem-router.

11. The primary modem-router of claim 10, wherein the indirect connectivity data comprises at least one element of a group comprising:
port forwarding rules for exclusively reserving communication ports of the further modem-router for use by the primary modem-router;
node connectivity data for enabling the modem-router to connect to an access node on the home network during the communication with the home network through the further modem-router;
authentication data for enabling authentication of the primary modem-router by a network entity of the home network during the communication with the home network through the further modem-router.

12. The primary modem-router of claim 6:
wherein the line monitoring hardware is configured to provide a connection restore signal upon detecting restoration of sufficient quality of the monitored access connection;
wherein the processing hardware is configured to discontinue the wireless connection with the further modem-router upon receipt of the connection restore signal.

13. A method of enabling communication between user equipment and a packet switched network using a primary modem-router unit; wherein the primary modem-router unit comprises: an access communication unit comprising a network connector unit configured to enable an access connection between the primary modem-router unit and the network; a wireless communication unit configured to enable wireless connections with the user equipment; a line monitoring unit; and a processing unit; the method comprising:
the line monitoring unit monitoring an in-use connection quality status of the access connection through the network connector unit;
the line monitoring unit causing the generation of, dependent on the connection quality status, a connection failure signal upon detection of insufficient quality of the access connection;
the processing unit receiving signals from the line monitoring unit;
the processing unit, in response to receipt of the connection failure signal, establishing a wireless connection through the wireless communication unit with a further modem-router unit for enabling a communication with the packet switched network through the further modem-router unit; and
at least one of:
the processing unit sending port forwarding rules to the further modem-router unit for exclusively reserving communication ports of the further modem-router unit for use by the primary modem-router unit;
the processing unit retrieving node connectivity data, from a memory unit of the primary modem-router unit or from the network, for enabling the modem-router unit to connect to an access node on the network during the communication with the network through the further modem-router unit;
the processing unit sending authentication data to a network entity of the network for enabling authentication of the primary modem-router unit by the network entity during the communication with the network through the further modem-router unit; and
the processing unit, upon establishing the wireless connection with the further modem-router unit, retrieving an updated public internet protocol address for the primary modem-router unit on the network for use during the communication with the network through the further modem-router unit.

14. The method of claim 13 wherein the processing unit enables the communication by sending and receiving data packets, the method further comprising:
the processing unit encapsulating the data packets in a tunneling data protocol for sending through the further modem-router unit;
the processing unit retrieving received data packets from the tunneling data protocol during the communication with the network through the further modem-router unit.

* * * * *

UNITED STATES PATENT AND TRADEMARK OFFICE
CERTIFICATE OF CORRECTION

PATENT NO.        : 9,204,482 B2
APPLICATION NO.   : 13/634202
DATED             : December 1, 2015
INVENTOR(S)       : Den Hartog It is certified that error appears in the above-identified patent and that said Letters Patent is hereby corrected as shown below:

In the specification,

In Column 7, Line 49, delete "processing unit 4" and insert -- processing unit --, therefor.

Signed and Sealed this
Fifteenth Day of March, 2016

Michelle K. Lee
*Director of the United States Patent and Trademark Office*